May 28, 1940.                E. C. BRODIN                2,202,770
                      SEAL FOR ENCLOSED BEARINGS
                          Filed May 4, 1939
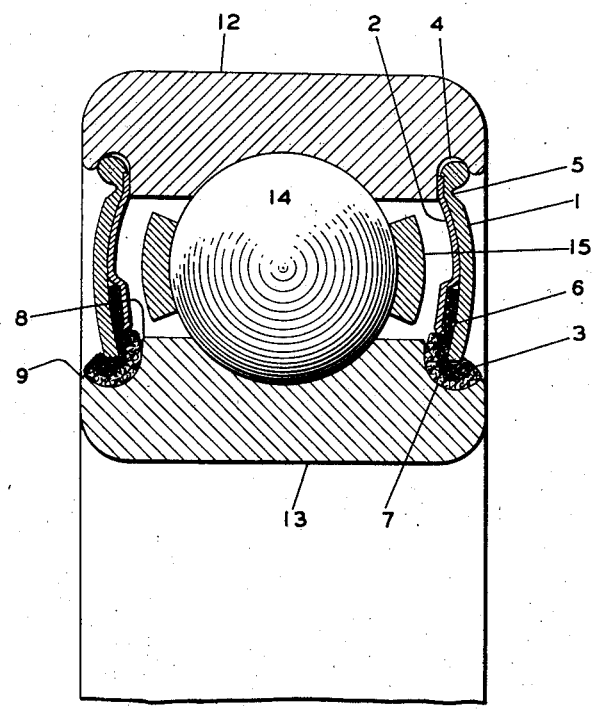
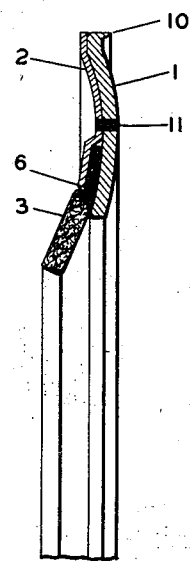
INVENTOR.
Eric C. Brodin
BY
HIS ATTORNEY.

Patented May 28, 1940

2,202,770

UNITED STATES PATENT OFFICE 2,202,770

SEAL FOR ENCLOSED BEARINGS

Eric C. Brodin, Jenkintown, Pa., assignor to S K F Industries, Inc., Philadelphia, Pa., a corporation of Delaware

REISSUED
OCT 1 - 1940

Application May 4, 1939, Serial No. 271,662

4 Claims. (Cl. 286—5)

This invention relates to enclosed bearings and has for an object to provide an improved bearing enclosure.

In the drawing accompanying this application, one practicable form of my invention is illustrated, in which drawing:

Figure 1 shows in longitudinal section the upper part of a bearing which is provided with a form of my invention, and Figure 2 shows a similar view of one of the sealing plates before this has been applied to the bearing rings.

Figure 1 indicates the parts composing the seal in place which includes the main body plate 1, the holding plate 2, and the sealing medium 3 which may be felt or some other flexible and compressive material. On the outside diameter of plate 1 a burr or protrusion 10 is provided which permits of using a wider groove 4 in the outer race of the bearing and facilitates the holding power of the plate when spun in as at 5. It will be noted that in the spinning operation the metal flow follows around the outside diameter of plate 2 and expands into the groove 4, making a tight joint to prevent lubricant leakage and at the same time, although it does not necessarily have to fill the groove, holds the assembly sufficiently rigid in the outer ring so that considerable pressure would be required to force the combined seal out of the bearing.

The use of compressive material 3 together with the form of the groove 7, permits the use of this seal in a narrow space with the sealing element having the full expanded thickness.

Plate 2 is shown provided with a burr or protrusion 6 at the bore of the plate. This is intended to bite into the sealing medium 3 in order that it may be more rigidly held when plates 1 and 2 are placed together, thus compressing the sealing medium 3 to a small percent of the original thickness.

The assembly of the sealing combination into the bearing may be done either of two ways: by installing it in the bearing, piece by piece, and then clamping the sealing medium 3 by the spinning operation leaving the recess 5; or it may be accomplished as a unit assembly as in Figure 2 by spot-welding the two plates together at two or more points 11, and then placing it in the groove 4 and spinning as before.

The object of this design is to provide an efficient seal for retaining lubricant within the bearing and excluding foreign matter from without. The bearing in the illustration comprises an outer ring 12, an inner ring 13 and a complement of balls 14, held together by a cage 15. It has been demonstrated that the effectiveness of the seal depends upon the area of the sealing surface—that is, the surface in contact between the sealing element 3 and the groove 7 in the bearing ring.

The sealing medium 3 may preferably be applied in the form illustrated in Figure 2 wherein part of the seal medium, tightly compressed, is held between the two plates and the other part, as 3, extends loosely beyond the edge of the outer plate 1 and when this is placed within the bearing it wraps around the bore of the outer plate, as is illustrated, and extends outwardly beyond the outer plate and inwardly beyond the inner plate.

This design, however, is tended to serve as a satisfactory and efficient seal for bearings where space is considerably limited, such as is found in present types of standard bearings now produced by the anti-friction bearing industry. Various sealing methods have been developed where the amount of seal necessary has required that either the inner ring or outer ring, or both, have been increased in width. The present design however does not require any greater amount of lubricant space than is provided for in the design employed.

Another point of importance is the amount of resistance or torque reaction which is set up in the bearing due to the rubbing of the stationary seal against the rotating ring. Obviously, the variation in pressure between these two surfaces will act as a brake of varying magnitude. In this design the flexibility of the sealing element 3 can be varied so that when the complete construction, as shown in Fig. 2, is assembled in the bearing, the sealing element 3 automatically wraps itself around the bore of plate 2 and in the groove 7. The natural tendency of the sealing element is to retake its original flat shape thus compensating for any eventual use. The rubbing pressure may also be further controlled through varying by very small amounts the size of the hole in the plate 1, and by varying the thickness of the sealing element.

This type of seal obviously is not confined to use in bearings of present standard widths, but can also be used to the same advantage in bearings of any greater width.

In this design the shape of the groove 7 in the inner ring of the bearing is important. From the point 8, which in the showing is the corner of land 16 and the groove 7, to the point 9 the cross sectional form of the groove is that the point 8 is radially inward of the point 9 a considerable distance, and that the bottom of such groove is outward of this point 9. It may be said of the bearing as a whole that the edge 8 formed by the groove 7 and the land 16 is radially inward of the edge 9 of the groove and that this groove extends outward, in a radial direction, beyond the edge 9. As with the inner ring rotating, points 8 and 9 act as flingers—the action at 8, through centrifugal force, being to repel the lubricant from entering between the groove 7 and the sealing medium 3; likewise, at point 9 the action is to repel any foreign matter from the outside of the bearing entering at that location; and, likewise, should the lubricant or foreign matter find its way between the sealing medium and groove 7, the centrifugal action will tend to work such matter out from the bottom or any point on the groove surface.

Although but one form of my invention has been illustrated, yet changes may be made within the scope of my claims without departing from the spirit of my invention.

Having thus described my invention, I claim and desire to secure by Letters Patent the following:

1. The combination of two relatively rotatable circular members disposed one within the other and spaced apart, the inner member having a groove in its outer perimeter, a closure for the space between the members, it comprising a pair of plates fastened to the outer of them, there being between the free edges of the plates a ring of flexible material, said ring extending inwardly beyond the edges of the plates and being wrapped within the groove of the inner member over the edge of one of them.

2. The combination with a member having a circular bore, of a member rotatable within it and having a circular outer surface spaced apart from the surface of the said bore, the inner member being provided with a groove of such shape that it forms an inside corner acting as a flinger which while rotating holds the lubricant in the device, and forms an outside corner which holds out dust, a closure for the space between the members, it comprising a pair of plates fastened to the outer of said members, and each plate having an opening in its center, there being between the plates at and adjacent the said openings a ring of flexible material, said ring extending inwardly beyond the edges of the plates, entering the groove in the inner member, and being wrapped over the edges of the plates by its contact with the walls of the groove.

3. The combination of members disposed one within the other and spaced apart, the inner of said members being rotatable, and being provided with a groove near its edge, the sides of the groove acting when the inner ring is rotating as flingers, for preventing the passage of material past the groove, a closure for the space between the members, and each plate having an opening in its center, there being between the plates at and adjacent the said openings a ring of flexible material, one of the plates having a larger opening than the other plate and at the edge of such opening being provided with a burr projecting toward the other plate and biting into the ring, the said ring extending inwardly beyond the edges of the plates, entering the groove in the inner member, and being wrapped over the edges of the plates by its contact with the walls of the groove.

4. The combination with a member having a circular bore, of a member rotatable within it and having a circular outer surface spaced apart from the surface of the said bore, the inner member being provided with a groove commencing at the bore within the ring and running inwardly and then outwardly and ending well within the extension of the outline of the bore, which groove prevents substances passing it since they will have to act against centrifugal force, a closure for the space between the members, it comprising a pair of plates fastened to the outer of said members, and each plate having an opening in its center, there being between the plates at and adjacent the said openings a ring of flexible material, said ring extending inwardly beyond the edges of the plates, entering the groove in the inner member, and being wrapped over the edges of the plates by its contact with the walls of the groove.

ERIC C. BRODIN.